(12) United States Patent
Muhlhoff et al.

(10) Patent No.: US 7,502,124 B2
(45) Date of Patent: Mar. 10, 2009

(54) WHEEL AND TIRE ASSEMBLY AND METHOD OF DYNAMICALLY MEASURING TOPOLOGICAL PARAMETERS OF THE INSIDE SURFACE OF THE PERTINENT PORTION OF THE TIRE

(75) Inventors: Olivier Muhlhoff, Clermont-Ferrand (FR); Marc Chabry, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 106 days.

(21) Appl. No.: 11/674,712

(22) Filed: Feb. 14, 2007

(65) Prior Publication Data

US 2007/0204684 A1      Sep. 6, 2007

(30) Foreign Application Priority Data

Feb. 15, 2006    (FR) .................................. 06 01331

(51) Int. Cl.
    *G01B 11/24* (2006.01)
(52) U.S. Cl. ...................................... 356/601; 356/611
(58) Field of Classification Search ........................ None
    See application file for complete search history.

(56) References Cited

U.S. PATENT DOCUMENTS

| | | | |
|---|---|---|---|
| 6,367,884 B1 * | 4/2002 | Fogal et al. | 301/95.101 |
| 6,575,538 B2 | 6/2003 | Fogal, Sr. et al. | |
| 6,609,417 B1 | 8/2003 | Cantu et al. | |
| 6,667,799 B2 * | 12/2003 | Ashimoto | 356/237.1 |
| 6,934,018 B2 * | 8/2005 | Shaw et al. | 356/237.2 |
| 7,119,896 B2 * | 10/2006 | Godeau et al. | 356/237.2 |
| 7,187,437 B2 * | 3/2007 | Shaw et al. | 356/237.2 |
| 2002/0036039 A1 | 3/2002 | Shimura | |
| 2003/0000295 A1 | 1/2003 | Fogal, Sr. et al. | |
| 2003/0050743 A1 * | 3/2003 | Caretta et al. | 701/1 |
| 2003/0167832 A1 | 9/2003 | Novak et al. | |
| 2005/0044943 A1 * | 3/2005 | Godeau et al. | 73/146 |

* cited by examiner

*Primary Examiner*—Michael P Stafira
(74) *Attorney, Agent, or Firm*—Jacox, Meckstroth & Jenkins

(57) ABSTRACT

The wheel and tire assembly for running on ground includes measurement means carried by the wheel for measuring topological parameters of the inside surface of a pertinent portion of the tire. These measurement means comprise lighting and viewing means for lighting and viewing a calibrated surface pattern that is subjected to the deformation of the inside surface of the pertinent portion of the tire. The viewing means are preferably of the stereovision type or of the structured light type.

18 Claims, 2 Drawing Sheets

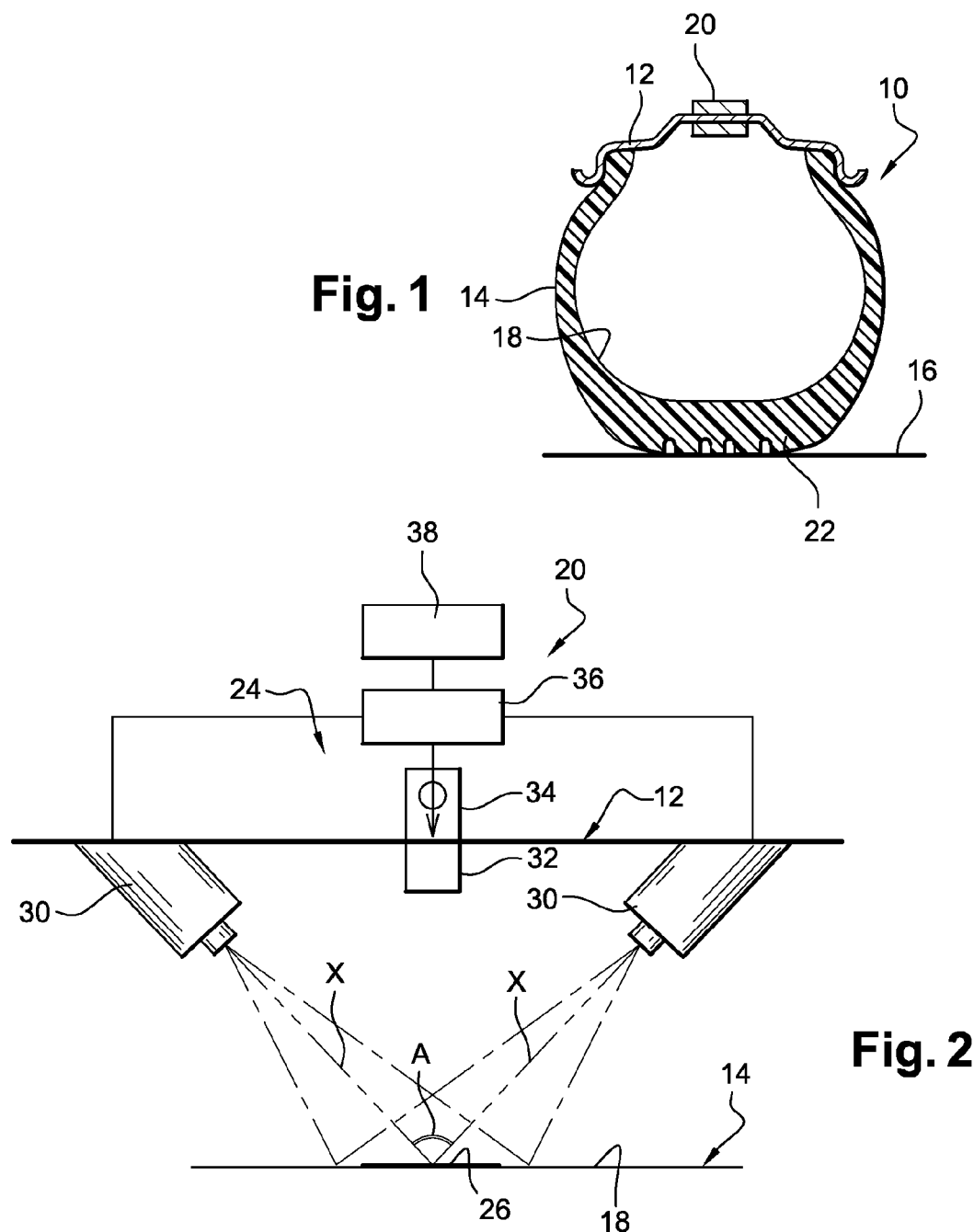
Fig. 1
Fig. 2
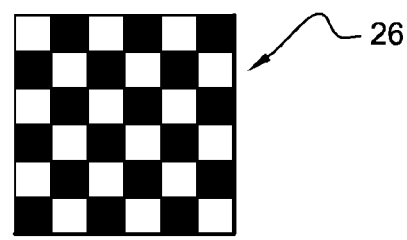
Fig. 3

WHEEL AND TIRE ASSEMBLY AND METHOD OF DYNAMICALLY MEASURING TOPOLOGICAL PARAMETERS OF THE INSIDE SURFACE OF THE PERTINENT PORTION OF THE TIRE

FIELD OF THE INVENTION

The present invention relates to a wheel and tire assembly and to a method of dynamically measuring topological parameters of the inside surface of the pertinent portion of the tire.

DESCRIPTION OF THE RELATED ART

It is desired to monitor the road behavior of a motor vehicle more effectively. For this purpose, it is desired in particular to be able to measure more and more accurately the deformations of vehicle tires while they are running in order to monitor contact between the ground and the tires, and to evaluate parameters that are suitable for characterizing the road behavior of the vehicle.

In the state of the art, and in particular from US 2003/0050743 A1, a wheel and tire assembly for running on ground is already known of the type that comprises means carried by the wheel for measuring topological parameters of the inside surface of a pertinent portion of the tire.

Generally, the pertinent portion of the tire is the portion that is in contact with the ground and is commonly referred to as the contact area.

The means described in US 2003/0050743 A1 for measuring topological parameters comprise a transmitter/receiver member carried by the wheel and serving firstly to transmit an incident signal towards the inside surface of the pertinent portion of the tire, and secondly to detect a signal reflected by a reflective element (generally in the form of a spot) carried by the inside surface, or reflected on the inside surface itself.

In order to determine any modifications in the (three-dimensional) shape and in the orientation of the contact area of the tire relative to a frame of reference tied to the wheel, the means described in US 2003/0050743 A1 for measuring topological parameters need to integrate numerous measurements presenting inaccuracies that are cumulative and that are therefore harmful to the reliability of the results.

There is therefore a need to provide an assembly and method for improving and overcoming one or more problems in the prior art.

SUMMARY OF THE INVENTION

A particular object of the invention is to make it easier and to improve the reliability of determining modifications to the (three-dimensional) shape and the orientation of the contact area of a tire, and to do so with means that can be mounted in the wheel and tire assembly.

To this end, the invention provides a wheel and tire assembly for running on ground and of the above-described type, that is characterized in that the measurement means comprise lighting and viewing means for lighting and viewing a calibrated surface pattern that is subjected to the deformation of the inside surface of the pertinent portion of the tire.

The calibrated surface pattern presents a known position relative to a frame of reference tied to the wheel, and it also has dimensions that are known when the tire is in a predetermined reference state.

The means for lighting and viewing this calibrated surface pattern make it possible to obtain images that can be processed easily, possibly by being compared with one another, in order to determine any modifications to the (three-dimensional) shape and the orientation of the contact area of the tire relative to a frame of reference tied to the wheel.

An image that corresponds to taking a measurement can be used to deduce numerous pertinent topological parameters of the contact area of the tire.

Thus, image processing makes it possible to deduce the following usual parameters in particular:
  camber angle;
  lateral offset;
  longitudinal offset;
  deflection;
  twisting of the contact area relative to the axis of the wheel;
  etc.

Image processing can also be used to detect and/or to quantify the following events:
  blistering of the inside rubber of the tire;
  aquaplaning;
  bounce;
  deformation of the sidewalls of the tire;
  etc.

According to other characteristics that are optional in various embodiments of this wheel and tire assembly:
  the lighting and viewing means comprise at least one video camera carried by the wheel to acquire images defined by an array of pixels;
  the video camera operates in "full-frame" mode, i.e. in a mode in which all of the pixels in the array of pixels are exposed simultaneously;
  the assembly includes detector means for detecting contact between the pertinent portion of the tire and the ground, e.g. means of the type for detecting the vertical direction or for detecting the azimuth of the tire;
  the calibrated surface pattern is a non-luminous pattern, but possibly a reflective pattern, arranged on the inside surface of the pertinent portion of the tire;
  the video camera is provided with a lens of focal length adapted to the size of the tire, and preferably of short focal length;
  the lighting and viewing means are of the stereovision type and comprise two video cameras having optical axes that converge towards the calibrated surface pattern, said optical axes forming between them an angle of 60°, for example;
  the lighting and viewing means include a light source selected from a flash-forming laser source and light-emitting diode (LED), or any other appropriate means;
  the pattern is selected from a checkerboard and a speckle pattern formed by a set of dots distributed in irregular manner;
  the lighting and viewing means are of the structured light type and include projection means for projecting a light pattern onto the inside surface of the pertinent portion of the tire, the light pattern forming the calibrated surface pattern;
  the inside surface of the pertinent portion of the tire is provided with markers, e.g. three markers each generally in the form of a spherical cap;
  the light pattern comprises alternating pale and dark fringes;
  the pixel arrays comprise rows or columns of pixels that are parallel to the fringes or inclined relative thereto, preferably at 45°; and
  the lighting and viewing means are adapted to emit a flash of duration shorter than 10 microseconds (µs).

The invention also provides a method of dynamically measuring topological parameters of the inside surface of the pertinent portion of the tire in an assembly as defined above, the method being characterized by measuring the deformations of the inside surface of the pertinent portion of the tire with the help of the lighting and viewing means lighting and viewing the calibrated surface pattern.

According to other characteristics that are optional in various implementations of the method:

the light source is controlled with the help of the detector means for detecting contact between the pertinent portion of the tire and the ground;

the projection means are controlled with the help of the detector means for detecting contact between the pertinent portion of the tire and the ground;

the camera is operated in synchronous mode, i.e. at a constant image acquisition frequency that is independent of the position and the speed of rotation of the wheel;

the images acquired are sorted by eliminating images that do not include the pattern; and the camera is operated in asynchronous mode, i.e. with image acquisition at a variable frequency controlled directly or indirectly as a function of the position or the speed of the wheel.

These and other objects and advantages of the invention will be apparent from the following description, the accompanying drawings and the appended claims.

BRIEF DESCRIPTION OF THE DRAWINGS

The invention can be better understood on reading the following description given purely by way of example and made with reference to the accompanying drawings, in which:

FIG. 1 is a half-view in axial section of a wheel and tire assembly constituting a first embodiment of the invention;

FIG. 2 is a diagrammatic view of the lighting and viewing means of the FIG. 1 wheel and tire assembly;

FIG. 3 is a face view of the calibrated surface pattern of the FIG. 1 wheel and tire assembly.

FIGS. 1 and 2 show a wheel and tire assembly constituting a first embodiment of the invention, given overall reference 10. This assembly 10 is connected to the structure of a vehicle (not shown) by conventional means.

Figure 4:
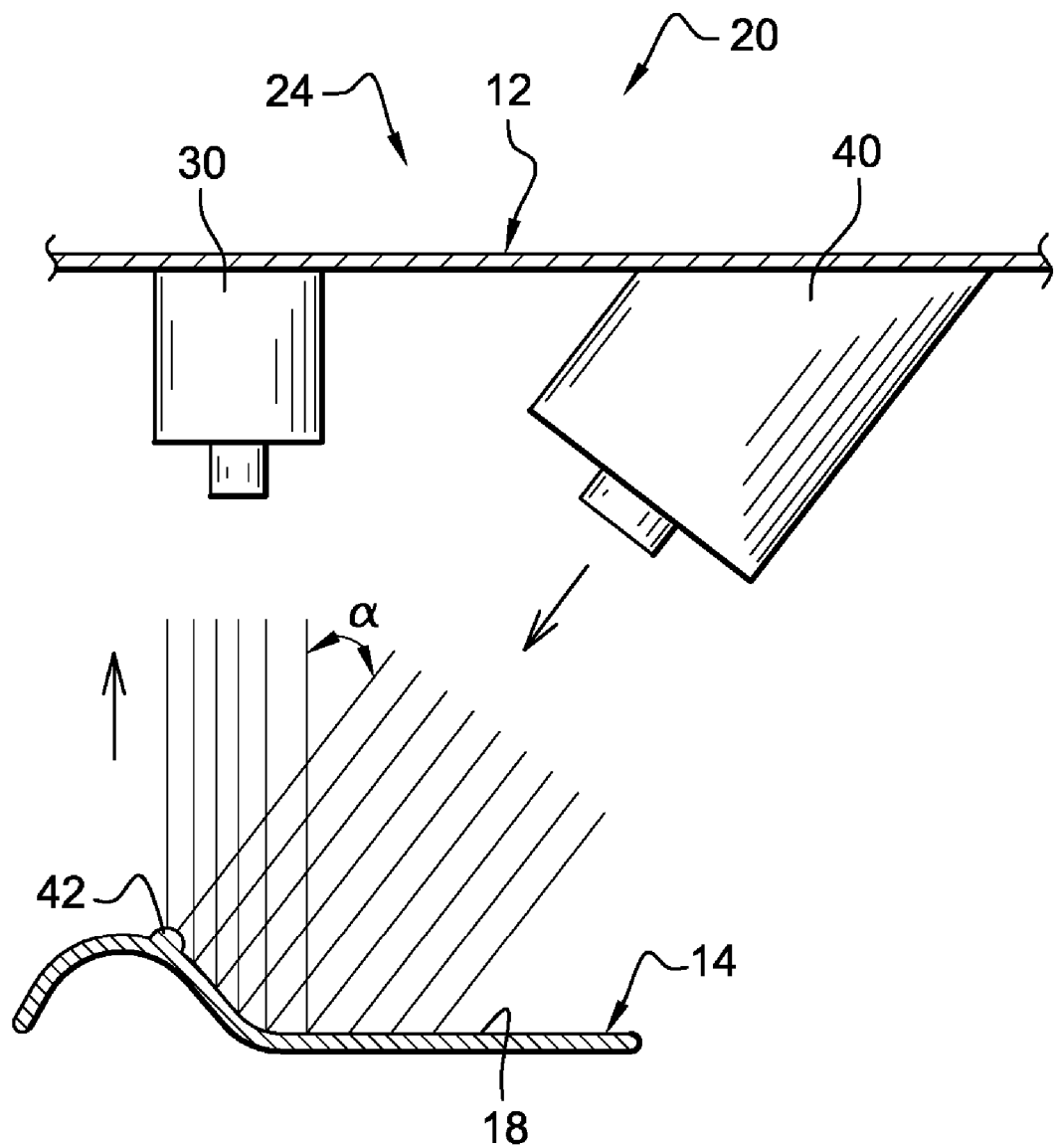
FIG. 4 is a diagrammatic view of the lighting and viewing means of a wheel and tire assembly constituting a second embodiment of the invention.

In conventional manner, the assembly 10 comprises a metal wheel 12 having a tire 14 mounted thereon to run on ground 16.

Also in conventional manner, the tire 14 is provided with an inside layer of rubber defining an inside surface 18 of the tire.

The assembly 10 includes means 20 carried by the wheel 12 for measuring topological parameters of the inside surface 18 of a pertinent portion 22 of the tire 41. The pertinent portion 22 of the tire 14 is the portion of the tire in contact with the ground 16. This pertinent portion 22 of the tire is generally referred to as the contact area.

The measurement means 20 are secured in known manner to the wheel 12, preferably in a substantially central annular groove in said wheel 12.

As can be seen in FIG. 2, where the measurement means 20 are shown in greater detail, said means 20 comprise lighting and viewing means 24 for lighting and viewing a surface pattern 26.

This surface pattern 26 may be calibrated, i.e. when the tire 14 is in a predetermined reference state, its position relative to a frame of reference tied to the wheel 12 is known and its dimensions are known.

The pattern 26 comprises alternating pale and dark zones. By way of example, the pattern 26 may be a checkerboard as shown in FIG. 3. In a variant, the pattern 26 may be speckled, being formed by a set of pale dots distributed in irregular manner.

In the first embodiment of the invention, the pattern 26 is a non-luminous pattern arranged on the inside surface 18 of the tire 14.

The pattern 26 is formed on or fitted to the inside surface 18 of the tire so as to be subjected to the deformations of the inside surface 18 of the contact area 22.

In a first embodiment of the invention, the lighting and viewing means 24 are of the stereovision type and comprise two video cameras 30 of conventional type each secured in known manner to the wheel 12. The optical axes X of the two cameras 30 converge towards the calibrated surface pattern 26. The two optical axes X form between them an angle A that is equal to 60°, for example.

Each video camera 30 is for acquiring images defined by an array of pixels, e.g. of 500 rows by 582 columns to provide a field of observation of 100☐100 square millimeters (mm$^2$).

Each camera operates in a "full-frame" mode, i.e. all of the pixels of the array of pixels are exposed simultaneously, like a photographic film. Full-frame mode is in contrast to "scan" mode, in which the pixels are scanned successively in even and odd fields.

The lighting and viewing means 24 also comprise a light source 32 for lighting the pattern 26 so that the cameras 30 can receive reflected images of the pattern 26. By way of example, the light source 32, is selected from a flash-forming LED, laser source, or any other suitable means.

The assembly 10 also includes conventional detector means 34 for detecting contact between the pertinent portion 22 of the tire and the ground 16. By way of example, the detector means 34 may be of the type that detect the vertical position, in particular by the Hall effect. The detector means 34 may also be made for detecting the azimuth of the tire during its rotation.

The two cameras 30, the light source 32, and the detector means 34 are connected to a controller 36, e.g. comprising an application-specific integrated circuit (ASIC).

The controller 36 is connected to conventional data storage means 38.

The detector means 34, the controller 36, and the data storage means 38 are preferably arranged in known manner on the wheel 12. In a variant, the data storage means 38, and possibly also the controller 36, could be arranged on the structure of the vehicle to which the assembly 10 is connected. Under such circumstances, conventional data transmission means are provided between the measuring means carried by the assembly 10 and the processing and storage means carried by the vehicle structure.

The above-described measuring means 20 enable a first implementation of the method of the invention to be performed for dynamically measuring topological parameters of the inside surface 18 of the pertinent portion 22 of the tire 14.

In this method, deformations of the inside surface 18 of the contact area 22 are measured using the means 24 for lighting and viewing the calibrated surface pattern 26.

Preferably:

the light source 32 is controlled (turned ON or OFF) with the help of the detector means 34 for detecting contact between the pertinent portion 22 of the tire 14 and the ground 16; and each camera 30 is caused to operate in synchronous mode, i.e. at a constant image acquisition frequency, independently of the position and the speed of rotation of the wheel 12.

Under such conditions, and for example selecting an image acquisition frequency of about 60 images per second, the probability that the contact area 22 that is in contact with the ground being in the field of view of the cameras 30 when the cameras acquire an image, and the lighting means 32 are activated is high, with this remaining true for vehicle speeds up to as much as 430 kilometers per hour (km/h) and for a tire 14 having an inside circumference of about 2 meters (m).

The light source enables flashes to be emitted that are of very short duration, less than 10 µs while performing measurements dynamically at high speed. The time spent in the contact area is of the order of a few milliseconds (ms). The camera images are thus sharp and suitable for processing.

Above a certain speed of rotation of the tire, it is possible that the tire performs more than one revolution between two images successively acquired by the camera. Under such circumstances, it is preferable to limit the frequency at which the light source 32 is switched on to a value that is lower than the camera image acquisition frequency so as to avoid images of the calibrated surface pattern 26 being superposed.

The images acquired by the camera 30 can easily be sorted. The images acquired while the lighting means 32 are off can easily be identified (no pattern) and can thus easily be eliminated so as to conserve only those that are useful for measurement purposes, i.e. those required while the lighting means 32 are on.

In a variant, each camera 30 can be operated in asynchronous mode, i.e. with the image acquisition frequency being variable and controlled directly or indirectly as a function of the position or the speed of the wheel 12, e.g. as a function of the means 34 detecting contact between the pertinent portion 22 of the tire 14 and the ground 16.

The images acquired by the cameras 30 are processed by the controller 36 using conventional principles commonly used with stereovision type lighting and viewing means.

In a variant, the two video cameras 30 for providing stereovision can be replaced by a single video camera provided with a short focal length lens. A video camera having a short focal length lens makes it possible, mutatis mutandis, to obtain information similar to the information obtained by means of two cameras 30 operating in stereovision.

FIG. 4 shows means 24 for viewing a wheel and tire assembly 10 in a second embodiment of the invention. In FIG. 4, elements that are analogous to those of the above figures are designated by identical references.

In this second embodiment of the invention, the viewing means 24 are of the structured light type and comprise conventional projector means 40 for projecting a light pattern onto the inside surface 18 of the pertinent portion 22 of the tire 14, thereby forming the calibrated surface pattern.

Preferably, the light pattern comprises alternating pale and dark fringes having the same width, e.g. a total of 50 fringes.

Furthermore, the viewing means comprise a single camera 30 for acquiring images defined by an array of pixels, e.g. comprising 750 rows by 580 columns for a field of observation of 100×150 mm².

In accordance with the conventional principles whereby structured light is implemented, the beam for projecting the pattern and the beam reflected by the inside surface 18 and picked up by the camera 30 forms an angle α.

The rows or the columns of the array of pixels in the camera 30 may be parallel to the fringes of the pattern. In a variant, the rows or columns of pixels of the array may be inclined at 45° relative to the fringes of the pattern, so that the accuracy of the measurements derived from the images acquired by the camera 30 are uniform in both the longitudinal and transverse directions of the fringe pattern.

Preferably, the inside surface 18 of the pertinent portion 22 of the tire is provided with markers 42, e.g. three markers (only one marker 42 is shown in FIG. 4). By way of example, each of these markers 42 is generally in the form of a spherical cap and serves to position the acquired images while they are being processed, in particular in order to compare images, and more particularly in order to be able to subtract images from one another.

The measurement means 20 shown in FIG. 4 serve to perform a second implementation of the method of the invention for dynamically measuring topological parameters of the inside surface 18 of the pertinent portion 22 of the tire.

In this method, the projection means 20 are controlled (turned ON or OFF) with the help of the detector means 34.

In a manner analogous with the first embodiment of the invention, the camera 30 can be operated in synchronous mode or in asynchronous mode.

As in the first implementation of the method of the invention, the projection means must be adapted to project the pattern during a very short period of time, less than 10 µs, in order to ensure that the images obtained are sharp and suitable for processing.

The images acquired by the camera 30 are processed using the conventional principles commonly used with structured light type viewing means.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A wheel and tire assembly for running on ground, the assembly being of the type including measurement means carried by the wheel for measuring topological parameters of the inside surface of a pertinent portion of the tire, the measurement means comprising lighting and viewing means for lighting and viewing a calibrated surface pattern that is subjected to the deformation of the inside surface of the pertinent portion of the tire; and said calibrated surface pattern being a non-luminous pattern, but possibly a reflective pattern, arranged on the inside surface of the pertinent portion of the tire;

wherein the lighting and viewing means comprises at least one video camera carried by the wheel to acquire images defined by an array of pixels and in which the lighting and viewing means are of the stereovision type and comprise two video cameras having optical axes that converge towards the calibrated surface pattern, said optical axes forming between them an angle of 60°, for example.

2. The wheel and tire assembly according to claim 1, in which the video camera operates in a mode in which all of the pixels in the array of pixels are exposed simultaneously.

3. The wheel and tire assembly according to claim 1, including detector means for detecting contact between the pertinent portion of the tire and the ground.

4. The wheel and tire assembly according to claim 1, in which the lighting and viewing means comprises at least one video camera carried by the wheel to acquire images defined by an array of pixels and said video camera is provided with a lens of focal length adapted to the size of the tire, and preferably of short focal length.

5. The wheel and tire assembly according to claim 1, in which the lighting and viewing means include a light source selected from a flash-forming laser source and LED.

6. The wheel and tire assembly according to claim 1, in which said calibrated surface pattern is selected from a checkerboard and a speckle pattern formed by a set of dots distributed in irregular manner.

7. The wheel and tire assembly according to claim 1, in which the lighting and viewing means is adapted to emit a flash of duration shorter than 10 μs.

8. A method of dynamically measuring topological parameters of an inside surface of the pertinent portion of the tire in an assembly according to claim 1, the method comprising the steps of measuring the deformations of the inside surface of the pertinent portion of the tire with the help of the lighting and viewing means for lighting and viewing the calibrated surface pattern.

9. The method according to claim 8 for measuring topological parameters of the inside surface of the pertinent portion of the tire of an assembly including detector means for detecting contact between the pertinent portion of the tire and the ground, e.g. means of the type for detecting the vertical direction or for detecting the azimuth of the tire, the lighting and viewing means of the assembly including a light source selected from a flash-forming laser source and LED, in which the light source is controlled with the help of the detector means for detecting contact between the pertinent portion of the tire and the ground.

10. The method according to claim 8 for measuring topological parameters of the inside surface of the pertinent portion of the tire of an assembly including detector means for detecting contact between the pertinent portion of the tire and the ground, e.g. means of the type for detecting the vertical direction or for detecting the azimuth of the tire, the pattern being selected from a checkerboard and a speckle pattern formed by a set of dots distributed in irregular manner, in which the projection means are controlled with the help of the detector means for detecting contact between the pertinent portion of the tire and the ground.

11. The method according to claim 8, for measuring topological parameters of the inside surface of the pertinent portion of the tire of an assembly whose lighting and viewing means comprises at least one video camera carried by the wheel to acquire images defined by an array of pixels and in which the camera is operated in synchronous mode, i.e. at a constant image acquisition frequency that is independent of the position and the speed of rotation of the wheel.

12. The method according to claim 11, in which the images acquired are sorted by eliminating images that do not include the pattern, in which the light source is controlled with the help of the detector means for detecting contact between the pertinent portion of the tire and the ground, the assembly including detector means for detecting contact between the pertinent portion of the tire and the ground, e.g. means of the type for detecting the vertical direction or for detecting the azimuth of the tire, the lighting and viewing means of the assembly including a light source selected from a flash-forming laser source and LED.

13. The method according to claim 8 for measuring topological parameters of the inside surface of the pertinent portion of the tire of an assembly in which the lighting and viewing means comprises at least one video camera carried by the wheel to acquire images defined by an array of pixels, in which the camera is operated in asynchronous mode, i.e. with image acquisition at a variable frequency controlled directly or indirectly as a function of the position or the speed of the wheel.

14. A wheel and tire assembly for running on ground, the assembly being of the type including measurement means carried by the wheel for measuring topological parameters of the inside surface of a pertinent portion of the tire, the measurement means comprising lighting and viewing means for lighting and viewing a calibrated surface pattern that is subjected to the deformation of the inside surface of the pertinent portion of the tire;

wherein the lighting and viewing means are of the structured light type and include projection means for projecting a light pattern onto the inside surface of the pertinent portion of the tire, the light pattern forming the calibrated surface pattern.

15. The wheel and tire assembly according to claim 14, in which the inside surface of the pertinent portion of the tire is provided with markers, e.g. three markers each generally in the form of a spherical cap.

16. The wheel and tire assembly according to claim 14, in which the light pattern comprises alternating pale and dark fringes.

17. The wheel and tire assembly according to claim 16, in which the lighting and viewing means comprises at least one video camera carried by the wheel to acquire images defined by an array of pixels and in which the pixel arrays comprise rows or columns of pixels that are parallel to the fringes or inclined relative thereto, preferably at 45°.

18. A method of dynamically measuring topological parameters of an inside surface of the pertinent portion of the tire in an assembly according to claim 14, the method comprising the steps of measuring the deformations of the inside surface of the pertinent portion of the tire with the help of the lighting and viewing means for lighting and viewing the calibrated surface pattern.

* * * * *